US009400330B2

(12) United States Patent
Achanta et al.

(10) Patent No.: US 9,400,330 B2
(45) Date of Patent: Jul. 26, 2016

(54) MANIPULATION RESILIENT TIME DISTRIBUTION NETWORK

(71) Applicant: Schweitzer Engineering Laboratories, Inc., Pullman, WA (US)

(72) Inventors: Shankar V. Achanta, Pullman, WA (US); Gregory C. Zweigle, Pullman, WA (US); Christopher R. Huntley, West Vancouver (CA)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 428 days.

(21) Appl. No.: 13/896,999

(22) Filed: May 17, 2013

(65) Prior Publication Data

US 2014/0111377 A1    Apr. 24, 2014

Related U.S. Application Data

(60) Provisional application No. 61/716,402, filed on Oct. 19, 2012.

(51) Int. Cl.
*G01S 19/20* (2010.01)
*G01S 19/21* (2010.01)

(52) U.S. Cl.
CPC .............. *G01S 19/20* (2013.01); *G01S 19/215* (2013.01)

(58) Field of Classification Search
CPC ....... G01S 19/20; G01S 19/03; G01S 5/0018; G01S 5/0027
USPC ........................................ 342/357.58, 357.25
See application file for complete search history.

(56) References Cited

U.S. PATENT DOCUMENTS

| 5,160,926 A | 11/1992 | Schweitzer |
| 5,557,284 A | 9/1996 | Hartman |

(Continued)

FOREIGN PATENT DOCUMENTS

| WO | 9747987 | 12/1997 |
| WO | 2012151006 | 11/2012 |
| WO | 2014005016 | 1/2014 |

OTHER PUBLICATIONS

PCT/US2014/010507 Patent Cooperation Treaty, International Search Report and Written Opinion of the International Searching Authority, May 6, 2014.

(Continued)

*Primary Examiner* — Harry Liu
(74) *Attorney, Agent, or Firm* — Richard M. Edge (57) ABSTRACT

Disclosed herein is a system for detecting manipulation of a global time source such as a Global Navigational Satellite System (GNSS) signal and mitigating against such manipulation. A plurality of receivers with geographical diversity receive GNSS signals, and calculate a time signal to be distributed to consuming devices. The receivers also communicate calculated time signals with other receivers. The receivers compare the time signals, and when a difference between the time signals exceeds a predetermined threshold, the receivers indicate that manipulation is likely. Such indication is shared across the network of receivers. The indication is further shared with consuming devices of the time signal from the compromised receiver. A second time signal that is not compromised may be shared with the consuming devices and/or used by the consuming devices. The consuming devices may modify their behavior when in receipt of the indication.

25 Claims, 5 Drawing Sheets

(56) References Cited

U.S. PATENT DOCUMENTS

| | | | |
|---|---|---|---|
| 5,737,715 A | 4/1998 | Deaton |
| 6,144,334 A | 11/2000 | Claffey |
| 6,229,479 B1 | 5/2001 | Kozlov |
| 6,483,856 B1 | 11/2002 | Bird |
| 7,146,516 B2 | 12/2006 | Dhupar |
| 7,375,683 B2 | 5/2008 | Smith |
| 7,398,411 B2 | 7/2008 | Zweigle |
| 7,436,232 B2 | 10/2008 | Sivero |
| 7,440,427 B1 | 10/2008 | Katz |
| 7,606,541 B1 | 10/2009 | Nicholls |
| 7,940,213 B2 | 5/2011 | Harper |
| 7,952,519 B1 | 5/2011 | Nielsen |
| 7,978,130 B1 | 7/2011 | Cohen |
| 7,979,228 B2 | 7/2011 | Zurbuchen |
| 8,055,288 B2 | 11/2011 | Ladd |
| 8,138,972 B2 | 3/2012 | Underbrink |
| 8,159,391 B2 | 4/2012 | Papadimitratos |
| 8,237,609 B2 | 8/2012 | Talbot |
| 8,325,087 B2 | 12/2012 | Thomson |
| 8,326,319 B2 | 12/2012 | Davis |
| 8,446,896 B2 | 5/2013 | Bedrosian |
| 8,564,330 B1 | 10/2013 | Radulov |
| 8,655,608 B2 | 2/2014 | Guzman-Casillas |
| 8,867,520 B2 | 10/2014 | Nicholls |
| 9,083,503 B2 | 7/2015 | Sagen |
| 9,270,442 B2 | 2/2016 | Rice |
| 9,319,100 B2 | 4/2016 | Achanta |
| 2002/0136172 A1 | 9/2002 | Chun |
| 2002/0158693 A1 | 10/2002 | Soong |
| 2002/0167934 A1* | 11/2002 | Carter .................. G01S 5/0081 370/350 |
| 2003/0087654 A1 | 5/2003 | Wheeler |
| 2003/0107513 A1* | 6/2003 | Abraham .............. G01S 5/0018 342/357.25 |
| 2004/0062279 A1 | 4/2004 | Primrose |
| 2004/0166879 A1 | 8/2004 | Meadows |
| 2004/0228368 A1 | 11/2004 | Jecmen |
| 2006/0259806 A1 | 11/2006 | Zweigle |
| 2007/0132773 A1 | 6/2007 | Plante |
| 2007/0194987 A1 | 8/2007 | Fedora |
| 2008/0062039 A1 | 3/2008 | Cohen |
| 2008/0169978 A1 | 7/2008 | Powell |
| 2008/0186229 A1 | 8/2008 | Van Diggelen |
| 2008/0198069 A1 | 8/2008 | Gronemeyer |
| 2009/0117928 A1 | 5/2009 | Ladd |
| 2009/0160705 A1 | 6/2009 | Matsuzaki |
| 2009/0315764 A1 | 12/2009 | Cohen |
| 2010/0030916 A1 | 2/2010 | Greenwood Graham |
| 2010/0034190 A1 | 2/2010 | Yun |
| 2010/0073228 A1 | 3/2010 | Smith |
| 2010/0117899 A1 | 5/2010 | Papadimitratos |
| 2010/0127928 A1 | 5/2010 | Thomson |
| 2010/0190509 A1 | 7/2010 | Davis |
| 2010/0222068 A1 | 9/2010 | Gaal |
| 2010/0231445 A1 | 9/2010 | Tarlow |
| 2010/0231448 A1 | 9/2010 | Harper |
| 2010/0253578 A1 | 10/2010 | Mantovani |
| 2010/0254225 A1 | 10/2010 | Schweitzer, III |
| 2011/0001668 A1 | 1/2011 | Cobb |
| 2011/0035066 A1 | 2/2011 | Schweitzer |
| 2011/0068973 A1* | 3/2011 | Humphreys .......... G01S 19/215 342/357.3 |
| 2011/0085540 A1 | 4/2011 | Kuwabara |
| 2011/0102258 A1 | 5/2011 | Underbrink |
| 2011/0102259 A1 | 5/2011 | Ledvina |
| 2011/0169577 A1 | 7/2011 | Nicholls |
| 2011/0181466 A1 | 7/2011 | Serrano |
| 2011/0227787 A1 | 9/2011 | Gum |
| 2011/0261917 A1 | 10/2011 | Bedrosian |
| 2011/0285586 A1 | 11/2011 | Ferguson |
| 2011/0287779 A1* | 11/2011 | Harper .................... G01S 19/03 455/456.1 |
| 2012/0005326 A1 | 1/2012 | Bradetich |
| 2012/0026037 A1 | 2/2012 | Thomson |
| 2012/0030495 A1 | 2/2012 | Chandhoke |
| 2012/0066418 A1 | 3/2012 | Foster |
| 2012/0116677 A1* | 5/2012 | Higgison .............. G01S 5/0027 701/518 |
| 2012/0179404 A1 | 7/2012 | Lee |
| 2012/0182181 A1 | 7/2012 | Dai |
| 2012/0195253 A1 | 8/2012 | Irvine |
| 2012/0195350 A1 | 8/2012 | Das |
| 2012/0323397 A1 | 12/2012 | Schweitzer, III |
| 2013/0157593 A1 | 6/2013 | Achanta |
| 2013/0244624 A1 | 9/2013 | Das |
| 2013/0328606 A1 | 12/2013 | Ravi |
| 2013/0335266 A1 | 12/2013 | Vollath |
| 2014/0003199 A1 | 1/2014 | Dougan |
| 2014/0094218 A1 | 4/2014 | Hammes |
| 2014/0100702 A1 | 4/2014 | Schweitzer |
| 2014/0232595 A1 | 8/2014 | Rife |
| 2014/0250972 A1 | 9/2014 | Achanta |
| 2014/0327574 A1 | 11/2014 | Achanta |
| 2014/0334477 A1 | 11/2014 | Stahlin |

OTHER PUBLICATIONS

PCT/US2015/029939 Patent Cooperation Treaty, International Search Report and Written Opinion of the International Searching Authority, Aug. 12, 2015.

Shepard, D., Humphreys, T., Fansler, A., "Evaluation of the Vulnerability of Phasor Measurement Units to GPS Spoofing Attacks", Oct. 2, 2011.

PCT/US2014/010422 Patent Cooperation Treaty, International Search Report and Written Opinion of the International Searching Authority, Sep. 16, 2014.

PCT/US2013/064012, Patent Cooperation Treaty, International Search Report and Written Opinion of the International Searching Authority, Dec. 19, 2013.

PCT/US2015/024000 Patent Cooperation Treaty, International Search Report and Written Opinion of the International Searching Authority, Jul. 13, 2015.

PCT/US2014/034358 Patent Cooperation Treaty, International Search Report and Written Opinion of the International Searching Authority, Sep. 22, 2014.

PCT/US2014/049813 Patent Cooperation Treaty, International Search Report and Written Opinion of the International Searching Authority, Apr. 2, 2015.

PCT/US2013/064942 Patent Cooperation Treaty, International Search Report and Written Opinion of the International Searching Authority, Jan. 29, 2014.

Tippenhauer, N.O., Popper, C., Rasmussen, K.B., Capkun, S., On the Requirements for Successful GPS Spoofing Attacks, in Proceedings of the ACM Conference on Computer and Communications Security (CCS), Oct. 2011.

Moore, P., Crossley, P., "GPS Applications in Power Systems Part 1 Introduction to GPS", Tutorial: GPS in Power Systems, Power Engineering Journal, Feb. 1999.

Jafarnia-Jahromi, A., Broumandan, A., Nielsen, J., Lachapelle, G., "GPS Vulnerability to Spoofing Threats and a Review of Antispoofing Techniques", International Journal of Navigation and Observation vol. 2012, Article ID 127072, Feb. 2012.

Wullems, C., "A Spoofing Detection Method for Civilian L1 GPS and the E1-B Galileo Safety of Life Service". IEEE Transactions on Aerospace and Electronic Systems, Aug. 2011.

Wen, H., Huang, P. Y., Dyer, J., Archinal, A., Fagan, J., "Countermeasures for GPS Signal Spoofing," Proceedings of the 18th International Technical Meeting of the Satellite Division of the Institute of Navigation (ION GNSS 2005), Long Beach, CA, Sep. 2005, pp. 1285-1290.

Gurtner, W., Estey, L., "Rinex: The Receiver Independent Exchange Format Version 3.00", Nov. 28, 2007.

Gurtner, W., "Rinex: The Receiver Independent Exchange Format Version 2", Sep. 2008.

PCT/US2013/058297, Patent Cooperation Treaty, International Search Report and Written Opinion of the International Searching Authority, Feb. 14, 2014.

(56) References Cited

OTHER PUBLICATIONS

PCT/US2013/065695, Patent Cooperation Treaty, International Search Report and Written Opinion of the International Searching Authority, Mar. 10, 2014.
PCT/US2013/065447, Patent Cooperation Treaty, International Search Report and Written Opinion of the International Searching Authority, Mar. 13, 2014.
PCT/US2015/054144 Patent Cooperation Treaty, International Search Report and Written Opinion of the International Searching Authority, Jan. 4, 2016.
Zhou et al., Adaptive Correction Method for an OCXO and Investigation of Analytic Cumulative Time Error Upper Bound, Jan. 2011, IEEE Transactions on Ultrasonics, Ferroelectrics, and Frequency Control, vol. 58, No. 1.

* cited by examiner

MANIPULATION RESILIENT TIME DISTRIBUTION NETWORK

RELATED APPLICATION

The present application claims the benefit under 35 U.S.C. §119(e) of U.S. Provisional Patent Application No. 61/716,402 filed 19 Oct. 2012 and titled "Manipulation Resilient Time Distribution Network" which application is incorporated herein by reference in its entirety.

TECHNICAL FIELD

This disclosure relates to a time distribution network that is resilient to manipulation. More particularly, this disclosure relates to detection of electromagnetic signal hijacking in a time distribution network, and continued time distribution during such signal hijacking.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be illustrated as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of non-transitory machine-readable media suitable for storing electronic instructions.

Figure 1:
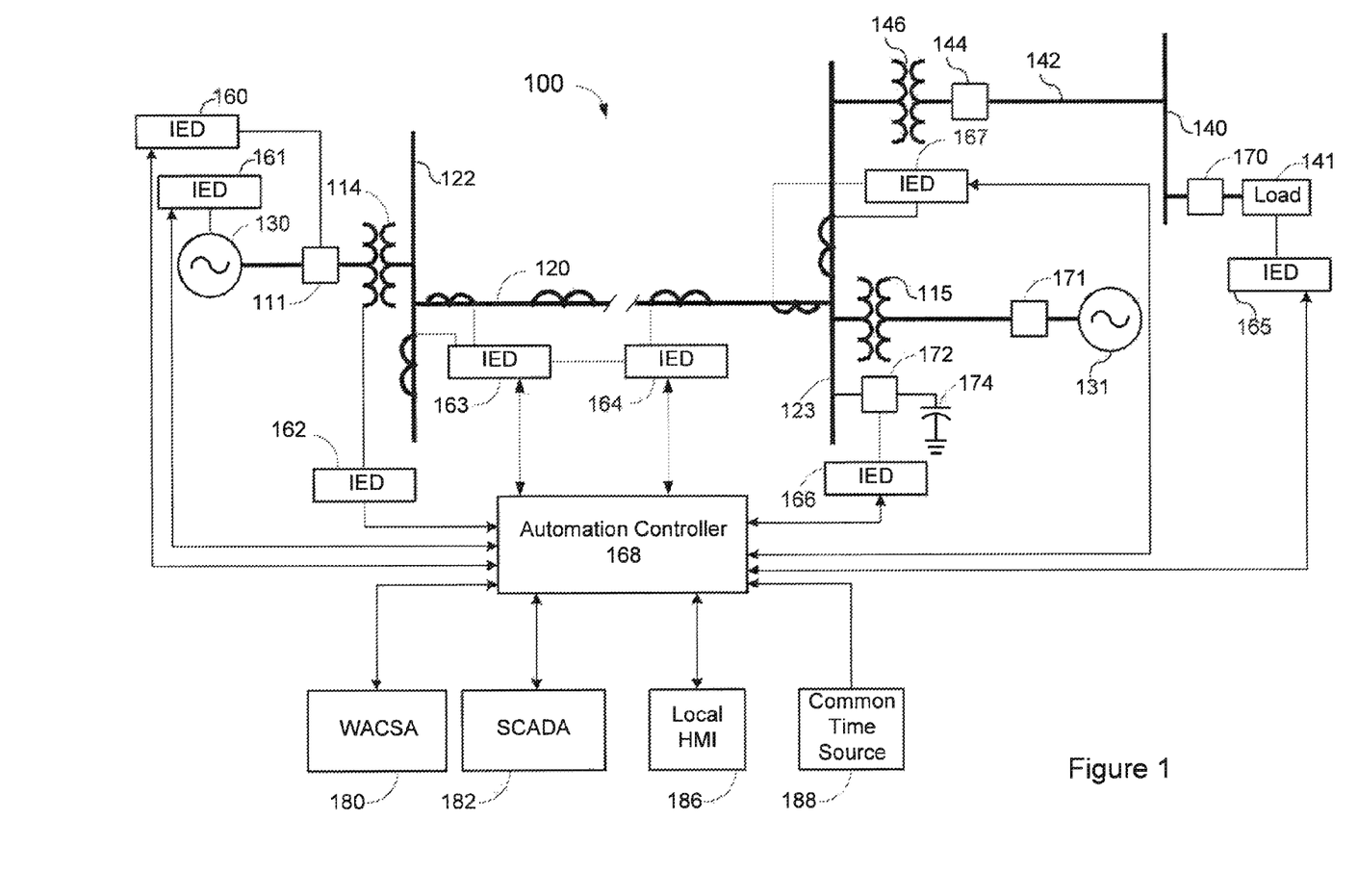
FIG. 1 illustrates a simplified one-line diagram of an electric power delivery system.

FIG. 1 illustrates a simplified diagram of an example of an electric power delivery system 100 consistent with embodiments disclosed herein. The systems and methods described herein may be applied and/or implemented in the electric power delivery system 100 illustrated in FIG. 1. Although illustrated as a one-line diagram for purposes of simplicity, an electrical power delivery system 100 may also be configured as a three-phase power system. The electric power delivery system 100 may include electric generators 130 and 131, configured to generate an electrical power output, which in some embodiments may be a sinusoidal waveform.

Generators 130 and 131 may be selectively connected to the electric power delivery system using switches or circuit breakers 111 and 171, respectively. Step-up transformers 114 and 115 may be configured to increase the output of the electric generators 130 and 131 to higher voltage sinusoidal waveforms. Buses 122 and 123 may distribute the higher voltage sinusoidal waveform to a transmission line 120 between buses 122 and 123. Step-down transformer 146 may decrease the voltage of the sinusoidal waveform from bus 123 to a lower voltage suitable for electric power distribution on line 142. Distribution line 142 is further selectively connectable to bus 123 via circuit breaker or switch 144, and may distribute electric power to a distribution bus 140. Load 141 (such as a factory, residential load, motor, or the like) may be selectively connected to distribution bus 140 using switch or circuit breaker 170. It should be noted that additional transformers or other equipment may be used to further step down a voltage from the distribution bus 140 to the load 141.

Various other equipment may be included in the electric power delivery system. Also illustrated is switched capacitor bank ("SCB") 174 selectively connectable to transmission bus 123 using circuit breaker or switch 172. Other equipment that may be included in the electric power delivery system may include, for example, static VAR compensators, reactors, load tap changers, voltage regulators, autotransformers, and the like. Some of these are considered as included in the electric power system 100 such as, for example, load tap changers can be considered as part of the load 141. Generators 130 and 131, may be any generator capable of providing electric power to the electric power delivery system, and may include, for example, synchronous generators, turbines (such as hydroelectric turbines, wind turbines, gas-fired, coal-fired, and the like), photovoltaic electric generators, tidal generators, wave power generators, and the like. Such generation machines may include components such as power-electronically coupled interfaces for example doubly-fed induction machines, direct coupled AC-DC/DC-AC transfer devices, and the like. It should be noted that these are not exhaustive lists, and other equipment, machines, and connected devices may be considered under this disclosure.

Modern electric power delivery systems (which may include electric power generation systems, transmission systems, distribution systems, and consumption systems) are typically controlled using intelligent electronic devices (IEDs). FIG. 1 illustrates several IEDs 160-167 that may be configured to control one or more elements of the electric power delivery system. An IED may be any processor-based device that controls monitored equipment within an electric power delivery system (e.g., system 100). In some embodiments, the IEDs 160-167 may gather equipment status from one or more pieces of monitored equipment (e.g., generator 130). Equipment status may relate to the status of the monitored equipment, and may include, for example, breaker or switch status (e.g., open or closed), valve position, tap position, equipment failure, rotor angle, rotor current, input power, automatic voltage regulator state, motor slip, reactive power control set point, generator exciter settings, and the like. Further, the IEDs 160-167 may receive measurements concerning monitored machines or equipment using sensors, transducers, actuators, and the like. Measurements may relate to a measured status of the machine or equipment, and may include, for example, voltage, current, temperature, pressure, density, infrared absorption, viscosity, speed, rotational velocity, mass, and the like. With the equipment status and/or measurements, IEDs may be configured to derive or calculate derived values, for example, power (real and reactive), magnitudes and angles of voltages and currents, frequency, rate of change of frequency, phasors, synchrophasors, fault distances, differentials, impedances, reactances, symmetrical components, alpha components, Clarke components, alarms, and the like.

According to certain embodiments, IEDs 160-167 may issue control instructions to the monitored equipment in order to control various aspects relating to the monitored equipment. Some examples of actions to control equipment include: opening a breaker which disconnects a generator with a rotor angle moving towards instability; opening a breaker which sheds load that is causing a voltage to decline towards a collapsing condition; opening a breaker to remove an asset when the asset, such as a line or transformer, is exceeding its safe operating limits; opening a breaker which sheds load that is causing the frequency of the system to decline such that it is exceeding predefined operating limits; inserting shunt capacitance with the effect of increasing the voltage on an electric power line so that the reactive requirements on a generator are not exceeded and therefore preemptively preventing the generator from being removed from service by a reactive power control; activating a dynamic brake which counters the acceleration of a machine rotor; adjusting a set-point on a governor to limit the power output of a synchronous machine so that it does not exceed the safe operating limits; simultaneously adjusting set-points of other synchronous machines so that they pick-up the new load; and, adjusting a voltage regulation set-point of an automatic voltage regulator such that a voltage at a more distant point in the power system does not exceed its maximum or minimum voltage threshold; and the like.

An IED (e.g., IED 160) may be in communication with a circuit breaker (e.g., breaker 111), and may be capable of sending an instruction to open and/or close the circuit breaker, thus connecting or disconnecting a portion of a power system. In another example, an IED may be in communication with a recloser and capable of controlling reclosing operations. In another example, an IED may be in communication with a voltage regulator and capable of instructing the voltage regulator to tap up and/or down. Information of the types listed above, or more generally, information or instructions directing an IED or other device or equipment to perform a certain action, may be generally referred to as control instructions.

IEDs 160-167 may be communicatively linked together using a data communications network, and may further be communicatively linked to a central monitoring system, such as a supervisory control and data acquisition (SCADA) system 182, and/or a wide area control and situational awareness (WACSA) system 180. In certain embodiments, various components of the electrical power generation and delivery system 100 illustrated in FIG. 1 may be configured to generate, transmit, and/or receive GOOSE messages, or communicate using any other suitable communication protocol. For example, an automation controller 168 may communicate certain control instructions to IED 163 via messages using a GOOSE communication protocol.

The illustrated embodiments are configured in a star topology having an automation controller 168 at its center, however, other topologies are also contemplated. For example, the IEDs 160-167 may be communicatively coupled directly to the SCADA system 182 and/or the WACSA system 180. Certain IEDs, such as IEDs 163 and 164, may be in direct communication with each other to effect, for example, line differential protection of transmission line 120. The data communications network of the system 100 may utilize a variety of network technologies, and may comprise network devices such as modems, routers, firewalls, virtual private network servers, and the like. Further, in some embodiments, the IEDs 160-167 and other network devices (e.g., one or more communication switches or the like) may be communicatively coupled to the communications network through a network communications interface.

Consistent with embodiments disclosed herein, IEDs 160-167 may be communicatively coupled with various points to the electric power delivery system 100. For example, IEDs 163 and 164 may monitor conditions on transmission line 120. IED 160 may be configured to issue control instructions to associated breaker 111. IEDs 163, and 167 may monitor conditions on buses 122, and 123. IED 161 may monitor and issue control instructions to the electric generator 130. IED 162 may monitor and issue control instructions to transformer 114. IED 166 may control operation of breaker 172 to connect or disconnect SCB 174. IED 165 may be in communication with load center 141, and may be configured to meter electric power to the load center. IED 165 may be configured as a voltage regulator control for regulating voltage to the load center using a voltage regulator (not separately illustrated).

In certain embodiments, communication between and/or the operation of various IEDs 160-167 and/or higher level systems (e.g., SCADA system 182 or WACSA 180) may be facilitated by an automation controller 168. The automation controller 168 may also be referred to as a central IED, communication processor, or access controller. In various embodiments, the automation controller 168 may be embodied as the SEL-2020, SEL-2030, SEL-2032, SEL-3332, SEL-3378, or SEL-3530 available from Schweitzer Engineering Laboratories, Inc. of Pullman, Wash., and also as described in U.S. Pat. Nos. 5,680,324, 7,630,863, and U.S. Patent Application Publication No. 2009/0254655, the entireties of which are incorporated herein by reference.

The IEDs 160-167 may communicate a variety of types of information to the automation controller 168 including, but not limited to, operational conditions, status and control information about the individual IEDs 160-167, event (e.g., a fault) reports, communications network information, network security events, and the like. In some embodiments, the automation controller 168 may be directly connected to one or more pieces of monitored equipment (e.g., electric generator 130 or breakers 111, or 172).

The automation controller 168 may also include a local human machine interface (HMI) 186. In some embodiments, the local HMI 186 may be located at the same substation as automation controller 168. The local HMI 186 may be used to change settings, issue control instructions, retrieve an event report (which may originate from a specified IED), retrieve data, and the like. The automation controller 168 may further include a programmable logic controller accessible using the local HMI 186.

The automation controller 168 may also be communicatively coupled to a common time source (e.g., a clock) 188. In certain embodiments, the automation controller 168 may generate a time signal based on the common time source 188 that may be distributed to communicatively coupled IEDs 160-167. Alternatively, IEDs may be individually connected to a common time source. Based on the time signal, various IEDs 160-167 may be configured to collect and/or calculate time-aligned operational conditions including, for example, synchrophasors, and to implement control instructions in a time coordinated manner. IEDs may use the time information to apply a time stamp to operational conditions and/or communications. In some embodiments, the WACSA system 180 may receive and process the time-aligned data, and may coordinate time synchronized control actions at the highest level of the electrical power generation and delivery system 100. In other embodiments, the automation controller 168 may not receive a time signal, but a common time signal may be distributed to IEDs 160-167.

The common time source 188 may also be used by the automation controller 168 for time stamping information and data. Time synchronization may be helpful for data organization, real-time decision-making, as well as post-event analysis. Time synchronization may further be applied to network communications. The common time source 188 may be any time source that is an acceptable form of time synchronization, including, but not limited to, a voltage controlled temperature compensated crystal oscillator, Rubidium and Cesium oscillators with or without a digital phase locked loops, microelectromechanical systems (MEMS) technology, which transfers the resonant circuits from the electronic to the mechanical domains, or a Global Navigational Satellite System (GNSS) such as a Global Positioning System (GPS) receiver with time decoding. In the absence of a discrete common time source 188, the automation controller 168 may serve as the common time source 188 by distributing a time synchronization signal.

Several different GNSS systems (also referred to as GNSS constellations) are available or planned to be available. Some examples of a currently operational GNSS include the United States NAVSTAR Global Positioning System (GPS) system and the Russian GLONASS. Some examples of a GNSS planned for future operation include China's Beidou Navigation Satellite System (BDS), and the European Union's Galileo positioning system. It should be noted that a single GNSS system may include separate constellations (such as, for example, the BDS including a limited test system at a first constellation as well as a system being constructed at a second constellation).

As is detailed above, the electric power delivery system 100 illustrated in FIG. 1 includes local control and protection using IEDs 160-167, and wide-area control using the automation controller 168 and/or WACSA 180 and/or SCADA 182.

Figure 2:
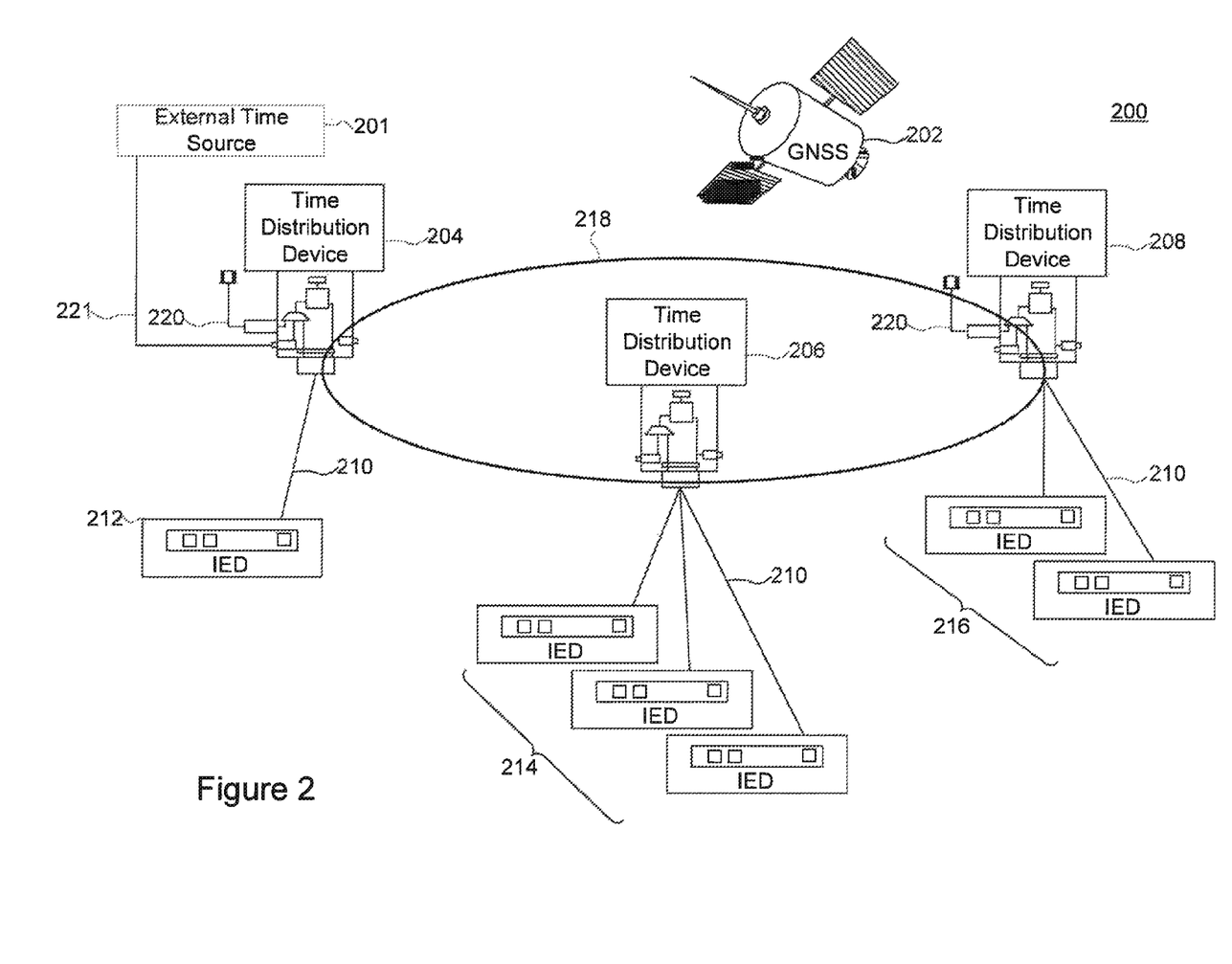
FIG. 2 illustrates a simplified diagram of a communication system.

FIG. 2 illustrates system 200 configured to be a highly reliable, redundant, and distributed system of time distribution devices 204, 206, and 208 capable of providing a precision time reference to various time dependent IEDs 212, 214, and 216 or automation controllers 168 as described above with respect to FIG. 1. Each time distribution device 204, 206, and 208 may be configured to receive and communicate time signals through multiple protocols and methods. While the system 200 is described as being capable of performing numerous functions and methods, it should be understood that various systems are possible that may have additional or fewer capabilities. Specifically, a system 200 may function as desired using only one protocol, or having fewer external or local time signal inputs.

As illustrated in FIG. 2, three time distribution devices 204, 206, and 208 have WAN capabilities and are communicatively connected to a WAN 218, which may comprise one or more physical connections and protocols. Each time distribution device 204, 206, and 208 may also be connected to one or more IEDs within a local network. For example, time distribution device 204 is connected to IED 212, time distribution device 206 is connected to IEDs 214, and time distribution device 208 is connected to IEDs 216. A time distribution device may be located at, for example, a power generation facility, a distribution hub, a substation, a load center, or other location where one or more IEDs are found. In various embodiments, an IED may include a WAN port, and such an IED may be directly connected to WAN 218. IEDs may be connected via WAN 218 or connection 210. Connection 210 may be, for example, a local area network (LAN) or a dedicated time communication link, such as an Inter-Range Instrumentation Group (IRIG) compliant communication link. In various embodiments, connection 210 may include multiple connections, for example, both a LAN and IRIG connection. Time distribution devices 204, 206, and 208 may establish and maintain a precision time reference among various system components. Each time distribution device 204, 206, and 208 may be configured to communicate time information with IEDs connected on connection 210 through one or more time distribution protocols, such as IEEE 1588.

Each time distribution device 204, 206, and 208 is configured to receive time signals from a variety of time sources. For example, as illustrated, time distribution device 204 includes an antenna 220 and is configured to receive a GNSS signal from a GNSS repeater or satellite 202. Time distribution device 204 is also configured to receive a second time signal 221 from an external time source 201. The external time source may comprise one or more voltage-controlled temperature-compensated crystal oscillators (VCTCXOs), phase locked loop oscillators, time locked loop oscillators, rubidium oscillators, cesium oscillators, NIST broadcasts (e.g., WWV and WWVB), and/or other devices capable of generating precise time signals. In the illustrated embodiment, time distribution device 208 includes an antenna 220 configured to receive a GNSS signal from the GNSS repeater or satellite 202. As illustrated, time distribution device 206 does not directly receive an external time signal, however, according to alternative embodiments, any number and variety of external time signals may be available to any of the time distribution devices.

According to one embodiment, WAN 218 comprises a synchronous optical network (SONET) configured to embed a precision time reference in a header or overhead portion of a SONET frame during transmission. Alternatively, a precision time reference may be conveyed using any number of time communications methods including IRIG protocols, NTP, SNTP, synchronous transport protocols (STP), and/or IEEE 1588 protocols. According to various embodiments, including transmission via SONET, a precision time reference may be separated and protected from the rest of the WAN network traffic, thus creating a secure time distribution infrastructure. Protocols used for inter IED time synchronization may be proprietary, or based on a standard, such as IEEE 1588 Precision Time Protocol (PTP). As mentioned above, communications may be using electrical communications, fiber-optic communications, radio communications, or the like.

According to various embodiments, time distribution devices 204, 206, and 208 are configured to perform at least one of the methods of detecting failure of a time source described herein. System 200 may utilize a single method or combination of methods, as described herein.

It is of note that even the most precise time signals may exhibit small discrepancies. For example, depending on the length and routing of the GNSS antenna cable, various clocks may exhibit microsecond level time offsets. Some of these offsets may be compensated by the user entering compensation settings, or may need to be estimated by the time synchronization network. Estimation may be performed during long periods of "quiet" operation (i.e., periods with no faults), with the individual source results stored locally in a nonvolatile storage register.

As can be seen, IEDs may receive time signals from one or more GNSS signals. Different IEDs may receive time signals from one or more GNSS signal sources that are different from the GNSS signal sources for other IEDs. That is, several different GNSS sources are available. The GPS system, for example, consists of around 32 satellites that orbit the Earth twice per sidereal day. Accordingly, several satellites are visible to each receiver at any given time, and different satellites may be visible to different receivers at different times each day.

Signals from the GNSS satellites arrive at the receivers, and may be used by the receivers to calculate position as well as time. Receivers in the systems of FIGS. 1 and 2 are typically stationary, using the GNSS signals to calculate time, and provide a common time to devices on the system.

Receivers of such signals may be vulnerable to attacks or manipulation such as blocking, jamming, and spoofing. In some cases, the GNSS receiver may continue to indicate that the signal is good, and signal lock may be maintained. Such attacks may attempt to prevent a position lock, or feed a receiver false information such that the receiver calculates a false position and/or time. Spoofing, or other manipulation, of time information in a system such as those of FIGS. 1 and 2 may introduce errors in the derived values by the IEDs, and/or errors into time stamps of equipment status, measurements, derived values, and communications among the devices. Such errors may result in improper control of the electric power delivery system. Accordingly, what is needed is detection of, and mitigation against such attacks.

As mentioned briefly above, GNSS systems such as GPS are susceptible to attacks such as electromagnetic signal hijacking, in a manner that is difficult for the time distribution device receiving the broadcast timing signal to detect. Once the broadcast signal is manipulated, then false information can be injected causing the time distribution device to distribute incorrect location and timing information.

According to one embodiment, a solution to the problem is through diversity of time distribution devices spread over a wide area network. While a single time distribution device might have difficulty detecting this attack, a network of time distribution devices, where one or more time distribution devices have independent time signal sources, can compare information to determine the reliability of each independent time signal source.

Figure 3:
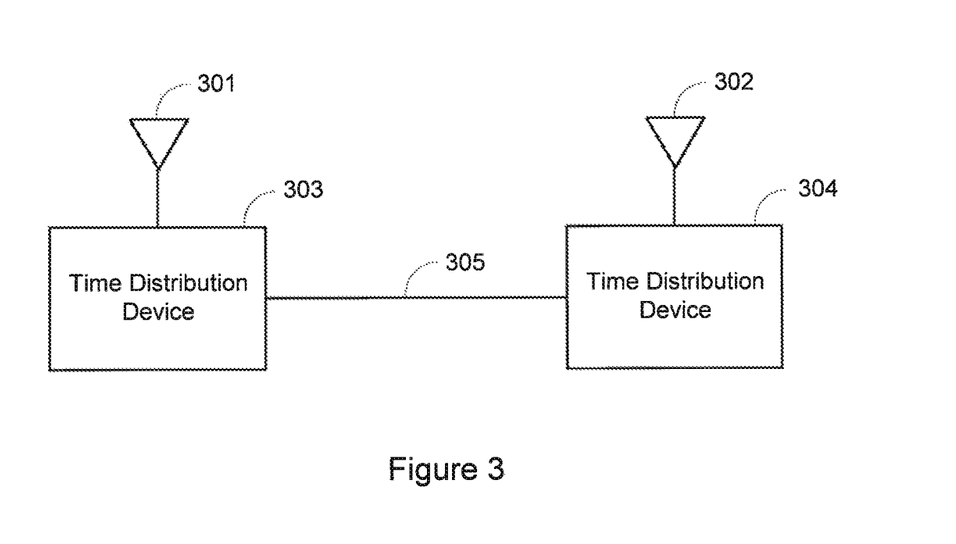
FIG. 3 illustrates a block diagram of clock devices in communication.

Consider, for example, FIG. 3 which shows two time distribution devices 303 and 304. Each time distribution device is configured to receive a time signal from a time signal source, such as a GNSS. For example, as shown in FIG. 3, time distribution devices 303 and 304 include antennas 301 and 302, respectively, which may be configured to receive a GNSS signal. The time distribution device 303 receives a time signal from the time signal source (i.e., one or more GNSS satellites) and decodes the time information carried on the time signal. In some embodiments, the time distribution device 303 may also compute a measure of the signal integrity. The time information and signal integrity may be shared over a communication network 305 with the time distribution device 304. Similarly, the time distribution device 304 may receive a time signal from a second time signal source, decode the time information, and compute a measure of the signal integrity. Again, this information may be shared over the communication network 305 with time distribution device 303. The time signals and signal integrity may be shared over the communication network 305 using a time distribution/synchronization protocol, for example, IEEE 1588, SONET, or the like.

Each time distribution device may compute a measure of possible signal manipulation based on time information decoded from a time signal and time information received over the network. In one embodiment, the measure of possible signal manipulation may be calculated according to the following logic:

```
IF (signal integrity from time distribution device 303 >
integrity_threshold) AND (signal integrity from time distribution device
304 > integrity threshold) AND absolute_value(time from time
distribution device 303 − time from time distribution device 304) > time
threshold THEN
    manipulation_indication = 1;
ELSE
    manipulation_indication = 0;
END
```

That is, a time distribution device asserts the manipulation_indication if both time distribution devices are receiving signals with a certain level of integrity, and yet the absolute time difference between the two exceeds a threshold.

In another embodiment the measure of possible signal manipulation is not dependent on the time difference. This measure is referred to herein as time-difference-free manipulation indication.

```
IF (signal integrity from time distribution device 303 <
integrity_threshold) OR (signal integrity from time distribution device
304 < integrity threshold) THEN
      manipulation_indication = 1;
ELSE
      manipulation_indication = 0;
END
```

Figure 4:
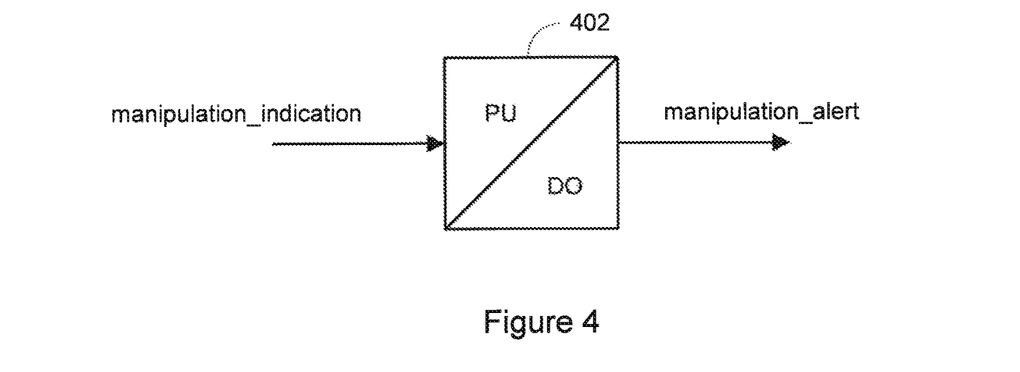
FIG. 4 illustrates a functional block diagram of a manipulation detection and mitigation module.

In some embodiments, assertion of the manipulation_indication may be verified with a security timer, such as the pick-up (PU) and drop-out (DO) timer block 402 as shown in FIG. 4. The timer block 402 provides some hysteresis to avoid prematurely indicate manipulation that may be attributed to something other than manipulation, for example, a noisy signal. As the manipulation_indication is refreshed, the timer block maintains a counter and if the manipulation_indication exceeds a threshold for a set number of PU intervals in sequence, then the timer block 402 asserts a manipulation_alert. The timer block will reset the manipulation_alert if a set number of DO intervals pass with no manipulation_indication (i.e., a value of 0). In some embodiments the DO may be set to infinity, which means that the manipulation_alert will not reset automatically, but may be reset manually.

Figure 5:
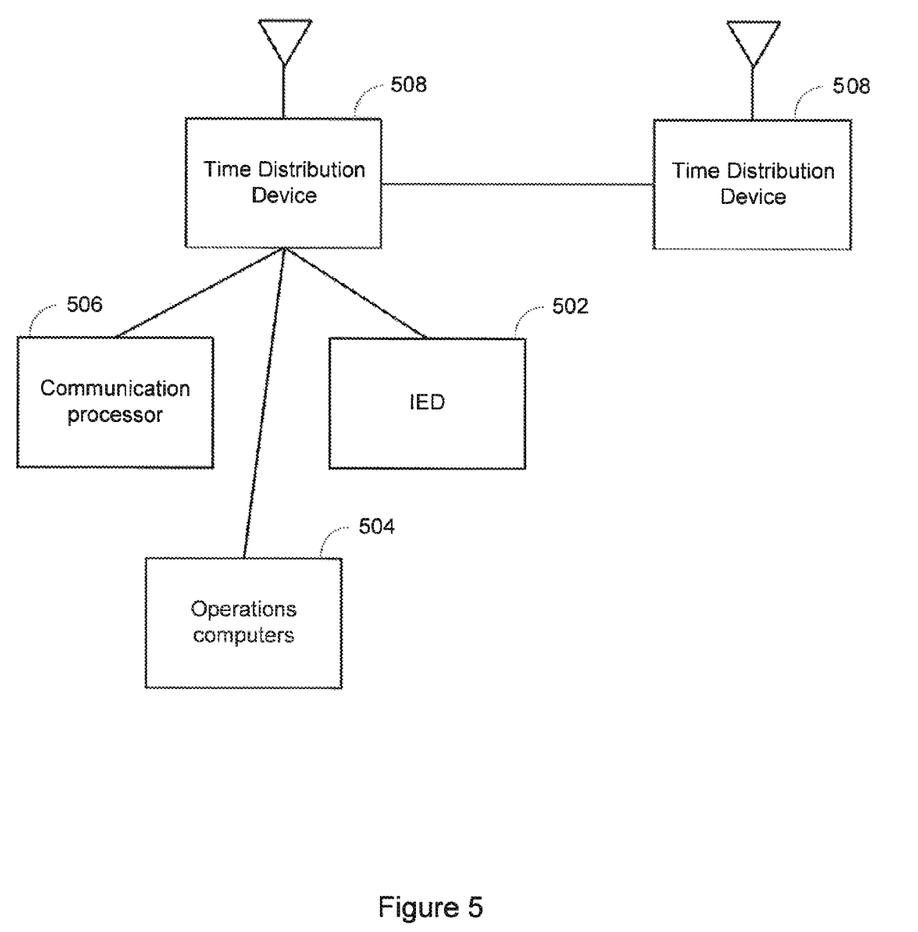
FIG. 5 illustrates a block diagram of a system for detection and mitigation of Global Navigational Satellite System ("GNSS") signal attacks.

Assertion of the manipulation_alert may cause one or more of the following actions in the system. In one embodiment, the alert may be communicated to power system operators to let them know of a possible attack. The system operators may be allowed to over-ride the alert if desired. In another embodiment, the alert may also cause a warning signal to be inserted into time information communicated from the time distribution device to IEDs or other devices using the time. This is shown, for example, in FIG. 5. Each IED 502, or other device (e.g., operations computer 504 and/or communication processor 506) that receives the time information, can use the manipulation_alert information from a time distribution device 508 as appropriate. For example, if the IED 502 is using the time information for protection or control and the time information includes a manipulation_alert, then the IED 502 may switch into a more secure mode and use locally time-stamped information instead of time-stamped information from the time distribution device 508.

Signal integrity can be calculated in a number of ways. Indeed, according to one embodiment, signal integrity is not calculated, or not used, and the manipulation_indication bit may be set simply by the time difference being greater than a predetermined threshold. It should be noted that as the signal integrity calculation increases in complexity (meaning more criteria, or more stringent criteria, are required to be met before a high signal integrity is achieved), the sensitivity of the attack detection and mitigation decreases and the resilience increases. Conversely, as the signal integrity calculation decreases in complexity, the sensitivity of the attack detection and mitigation increases and the resilience of the system decreases. A more resilient system, as used herein, is a system in which indications of manipulation are likely triggered by actual manipulation of the time source and fewer false indications of manipulation are triggered. This tradeoff allows tuning of the system according to user preferences. Such tuning may also take into account effects on the system of false manipulation indications as well as the effects on the system of a spoofing attack.

In one embodiment, signal integrity may be calculated using a signal-to-noise ratio (SNR). The SNR of the satellites may be sampled at regular time intervals at each time distribution device site, and the SNR data may be shared among time distribution devices spread over a wide area network. Signal integrity may be determined, for example, by measuring a change in the SNR that exceeds a signal integrity threshold. At the time of deployment of a time distribution device, a baseline SNR may be determined based on the installation site conditions to determine the signal integrity thresholds. This measure is suitable for time-difference-free manipulation indication.

In another embodiment, signal integrity may be calculated at each receiver using historical satellite data. As mentioned above, GNSS satellites may orbit Earth on a predetermined schedule, such as twice per sidereal day. Accordingly, a receiver may record the times at which each individual GNSS satellite comes into view and leaves view. With this information, the receiver may compare the times at which GNSS satellites come into view and, if the time does not correspond with historical information, the receiver may determine that signal integrity is compromised.

In yet another embodiment, signal integrity may be calculated using location information in three dimensions (latitude, longitude, and altitude) shared among receivers in the network. For stationary GNSS receivers, as the position is fixed, the location information is fairly static and bounded by a certain tolerance value. This information can be used to determine the signal integrity threshold and used in the receivers spread across the network to determine whether the time signal has been manipulated. This measure is suitable for time-difference-free manipulation indication.

According to another embodiment, signal integrity may be calculated based on a rate of change of a GNSS time signal (e.g., a GPS pulse-per-second signal). A time distribution device including a GNSS receiver may determine that a GNSS source has been manipulated or is otherwise unacceptable if the rate of change of the GNSS time signal exceeds the holdover performance of the time distribution device. In one example, the time distribution device may include a temperature-controlled crystal oscillator (TCXO) with a predetermined holdover performance. In this case, if the rate of change of the GNSS time signal from the GNSS source exceeds the predetermined holdover performance, the time distribution device may determine that the GNSS source is unreliable, and indicate a possible manipulation. For example, a TCXO may have a holdover performance of 50 ppb/degree. In this example, if a rate of change of the GNSS time signal exceeds 50 ppb (e.g., 100 ppb, which is 360 microseconds/hour) the time distribution device may determine that the GNSS source is unreliable. In another example, instead of a TCXO, the receiver may use a local time source with better holdover performance (e.g., a cesium-beam oscillator) and therefore detect even more subtle manipulation. This measure is suitable for time-difference-free manipulation indication.

Signal integrity may be determined by calculating a baseline using any of the methods described above. Baseline measurements can be made at the time of deployment for a period of time to "train" the network of clocks. The baseline measurements may then be used to calculate a threshold for the signal integrity when the timing information matches or is within a range across network of clocks. During operation of the clock network, if the time difference between the local and remote clocks, at a particular clock site, exceed a preset threshold value, then manipulation may be present. As mentioned above, the techniques described herein can be used to send communications indicating manipulation back to the time distribution device that is sending the time signal, such that the time distribution device can alert downstream devices.

In one embodiment, the time threshold may be calculated according to the maximum time difference allowed by the devices in the network, while still performing their tasks according to requirements. In another embodiment, the time threshold may be calculated according to the maximum amount of time deviation expected between the GNSS sources in the network.

As discussed briefly above, the signal threshold and the time threshold levels allow the users to trade sensitivity for resilience. The manipulation indication is made more sensitive by setting the thresholds low. This means even a weak signal, and with a small time difference, is enough to indicate possible manipulation, and may result in false indications of manipulation. The manipulation indication is made more resilient by setting these thresholds high. This assures that both very strong signals and large time differences are present before the manipulation indication asserts, and may result in fewer false indications of manipulation.

Similarly, the pick-up (PU) threshold allows the users to trade sensitivity for resiliency for the alert. By setting the PU threshold low the sensitivity may be increased. This means that only a few consecutive manipulation indications would result in triggering an alert. Again, this lower threshold may result in a greater likelihood of providing a false indication of manipulation. With a relatively higher PU threshold value a greater number of consecutive indications would be recorded before an alert is triggered, thus less likely be triggered by noise, resulting in a more resilient indication of manipulation.

Figure 6:
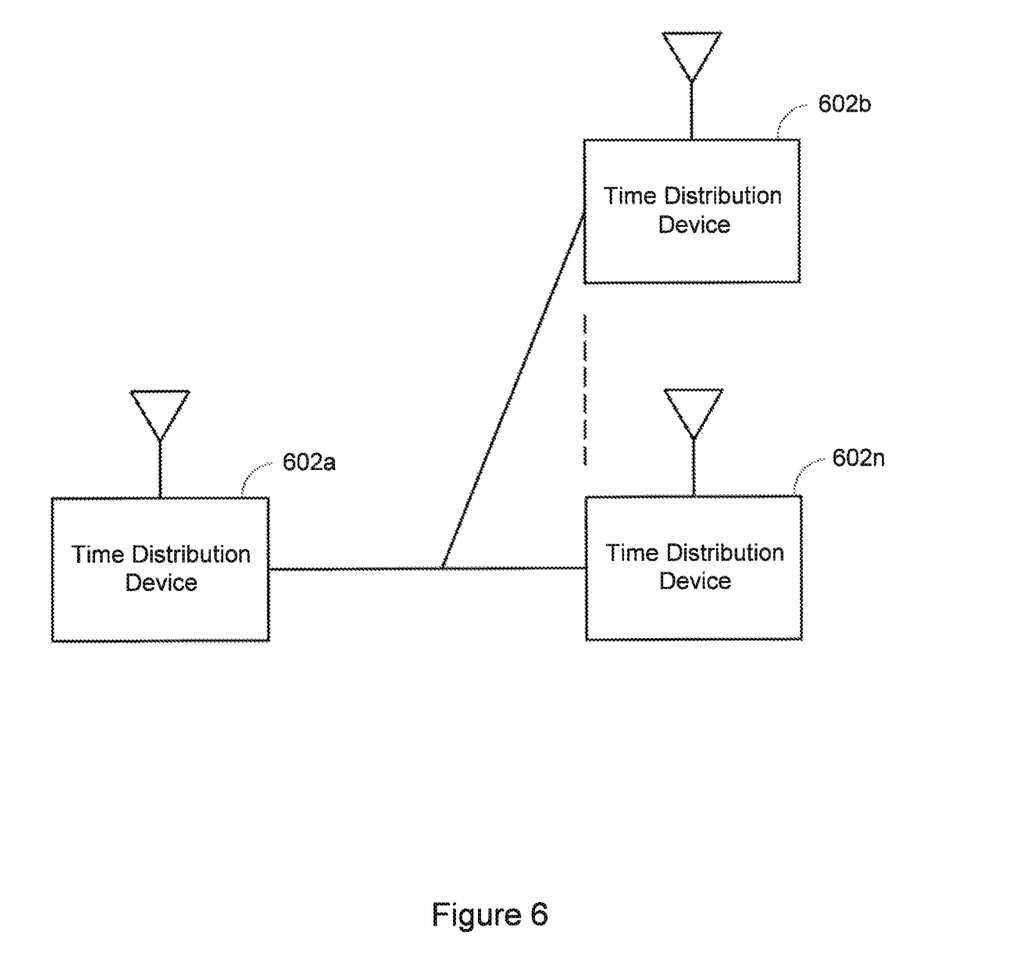
FIG. 6 illustrates a block diagram of a system for detection and mitigation of GNSS signal attacks.

In various embodiments, the reliability of a manipulation alert may be increased by placing time distribution device 303 and time distribution device 304 far apart geographically. This makes it very difficult for an attacker to generate a correlated signal with sufficient accuracy to simultaneously manipulate time distribution device 303 and time distribution device 304, to keep their time difference sufficiently small as to stay below the time threshold. Additionally, FIG. 6 illustrates a method to make the time distribution system even more resilient to attack. In the example of FIG. 6 there are N time distribution devices 602a-602n in the system. Each of the time distribution devices calculates signal integrity and time information as described above and shares the signal integrity and time information with each of the other time distribution devices over communications network 604. After receiving signal integrity and time information from each of the other time distribution devices, each time distribution device first compares the signal integrity sent by each other time distribution device to a global signal integrity threshold. The time distribution device then compares the time information of those time distribution devices that have a signal integrity greater than the global integrity threshold and determines a maximum time difference (i.e., the difference between the earliest and latest times). If the maximum time difference exceeds a time threshold then the time distribution device may transmit a manipulation_indication signal. Each of the clock devices makes this calculation individually but the manipulation_indication may be shared globally. This ensures that no single devices can be attacked and corrupted to falsely indicate that the system is ok.

In some cases it might be beneficial to include sub-threshold levels: one for warning and one for alert. In this case, the logic is modified as follows:

```
FOR ALL DEVICES WITH (signal integrity > integrity_threshold)
    IF the absolute value of the maximum difference > time warning
    threshold THEN
        manipulation_warning_indication = 1;
        manipulation_alert_indication = 0;
    ELSE IF the absolute value of the maximum difference > time alarm
    threshold THEN
        manipulation_warning_indication = 1;
        manipulation_alert_indication = 1;
    ELSE
        manipulation_warning_indication = 0;
        manipulation_alert_indication = 0;
    END
END
```

As described above with reference to FIG. 4, the results of the tests in the example of FIG. 6 may be qualified with pick-up and drop-out timers.

An alternative embodiment including alarms for a time-difference-free manipulation indication is as follows:

```
IF ANY DEVICE HAS (signal integrity < integrity_warning_threshold)
        manipulation_warning_indication = 1;
        manipulation_alert_indication = 0;
    ELSE IF ANY DEVICE HAS (signal integrity <
    integrity_alarm_threshold)
        THEN
            manipulation_warning_indication = 1;
            manipulation_alert_indication = 1;
        ELSE
            manipulation_warning_indication = 0;
            manipulation_alert_indication = 0;
        END
END
```

Embodiments of the present disclosure generally work with existing schemes that allow networked devices to select the best time source. In that case, the best time source may be based on using the time source that has the highest integrity. The manipulation alert, however, compares the time values only with a certain level of integrity and from that subset, verifies that the time information is within a certain amount of comparative error.

In one embodiment, a time signal integrity is not used in detecting manipulation of a GNSS signal. In this embodiment, each receiver in communication with a GNSS compares its time signal with time signals from at least two other receivers in communication with a GNSS. If a difference between the time signal of the first receiver time signal and those of the other receivers, then the receiver indicates a possible manipulation.

As outlined hereinabove, devices consuming a time signal from a GNSS receiver may include IEDs used for protection and/or control of an electric power delivery system. Protective functions of such IEDs may depend on a non-manipulated time signal integrity. Accordingly, IEDs may modify their protective functions upon receipt of a notification that time signal has been manipulated. For example, the IEDs may use time-stamped data from other IEDs in their protection elements when the time signal integrity indicates a manipulated time signal, and modify their settings to not use time-stamped data from other IEDs when a time signal is noted as being manipulated.

Such IEDs may be configured to issue control commands to the electric power delivery system such as, for example, a trip command to open a circuit breaker, recloser, or the like. Upon receiving a time signal manipulation status change from non-manipulated to manipulated, an IED may reverse a modification to its protection settings. Time manipulation may result in a trip command being generated, which trip command is not needed. Accordingly, the IED may be configured to block such trip commands generated when a time signal integrity status changes from non-manipulated to manipulated. Such a block may be maintained until a predetermined event such as passage of a predetermined amount of time, a trip command from another protective element within the IED that does not use time-stamped data from another IED, the manipulation signal has been de-asserted, or the like. Alternatively the time source may switch to a local shared time. The time values for the system become isolated from any external time source.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A system for detecting and mitigating against manipulated time signals, comprising:
   a first receiver at a first location configured to receive a first plurality of radio signals from a global time source and calculate a first time signal from the first plurality of radio signals; and
   a second receiver at a second location configured to receive a second plurality of radio signals from the global time source and calculate a second time signal from the second plurality of radio signals, the second receiver further configured to:
      receive the first time signal from the first receiver;
      calculate a time difference between the first time signal and the second time signal;
      compare the time difference with a defined time difference threshold; and
      communicate a manipulation alarm to the first receiver in response to determining that the time difference exceeds the defined time difference threshold.

2. The system of claim 1, wherein the first receiver is further configured to calculate a signal integrity based on the first plurality of radio signals and transmit the signal integrity to the second receiver.

3. The system of claim 2, wherein the second receiver is further configured to communicate the second time signal to the first receiver.

4. The system of claim 3, wherein the first receiver is configured to distribute the second time signal when the time difference exceeds the defined time difference threshold.

5. The system of claim 2, wherein the first receiver is further configured to calculate the signal integrity using a signal-to-noise ratio.

6. The system of claim 2, wherein the global time source is a Global Navigational Satellite System ("GNSS").

7. The system of claim 6, wherein, to calculate the signal integrity, the first receiver is further configured to:
   determine a location of the first receiver using the first plurality of radio signals; and
   compare the location with a known location of the first receiver.

8. The system of claim 7, wherein the known location is calculated using a plurality of radio signals from the GNSS during a time of signal integrity.

9. The system of claim 6, wherein the first receiver is further configured to calculate the signal integrity using historical satellite data.

10. The system of claim 2, wherein, to calculate the signal integrity, the first receiver is further configured to:
    measure a rate of change of the first time signal; and
    compare the rate of change with a holdover performance threshold of the first receiver.

11. A time distribution device comprising:
    an antenna configured to receive a plurality of radio signals from a global time source at a first location;
    a receiver configured to determine a first time from the plurality of radio signals;
    a communication component configured to transmit and/or receive data; and
    a manipulation detection component configured to:
       receive a time signal from a remote time distribution device at a second location;
       determine a second time from the time signal;
       calculate a time difference between the first time and the second time;
       compare the time difference with a defined time difference threshold; and
       transmit a manipulation alarm to the remote time distribution device in response to determining that the time difference exceeds the defined time difference threshold.

12. The time distribution device of claim 11, wherein the manipulation detection component is further configured to determine a signal integrity based on the plurality of radio signals.

13. The time distribution device of claim 12, wherein the manipulation detection component is further configured to determine the signal integrity based on a signal-to-noise ratio of the plurality of radio signals.

14. The time distribution device of claim 12, wherein the receiver is a Global Navigational Satellite System ("GNSS") receiver.

15. The time distribution device of claim 14, wherein the manipulation detection component is further configured to determine the signal integrity based on a location calculated by the GNSS receiver using the plurality of radio signals and a known location of the time distribution device.

16. The time distribution device of claim 12, wherein, to calculate the signal integrity, the manipulation detection component is further configured to:
    measure a rate of change of the first time; and
    compare the rate of change with a holdover performance threshold of the time distribution device.

17. The time distribution device of claim 14, wherein the manipulation detection component is further configured to determine the signal integrity based on historical satellite data.

18. The time distribution device of claim 11, wherein, in response to determining that the time difference exceeds the defined time difference threshold, the time distribution device is configured to transmit a local holdover time signal to downstream devices.

19. A time distribution device comprising:
    an antenna suitable for receiving a first plurality of radio signals from a global time source;
    a global time source receiver suitable for determining a first time from the first plurality of radio signals; and
    a manipulation detection component configured to:
       determine a first signal integrity of the first plurality of radio signals;
       receive a time signal, including a second time and a second signal integrity, from a remote time distribution device;

in response to determining that the first signal integrity and the second signal integrity are greater than a defined signal integrity threshold:
  calculate a time difference between the first time and the second time;
  compare the time difference with a defined time difference threshold; and
  transmit a manipulation indication to the remote time distribution device in response to determining that the time difference exceeds the defined time difference threshold.

20. The time distribution device of claim 19, wherein:
the defined time difference threshold comprises a warning threshold and an alarm threshold; and
the manipulation indication is a warning when the time difference exceeds the warning threshold but not the alarm threshold and an alarm when the time difference exceeds the alarm threshold.

21. The time distribution device of claim 19, wherein the manipulation detection component is configured to determine the first signal integrity based on a signal-to-noise ratio of the first plurality of radio signals.

22. The time distribution device of claim 19, wherein the global time source receiver is a Global Navigational Satellite System ("GNSS") receiver.

23. The time distribution device of claim 22, wherein the manipulation detection component is configured to determine the first signal integrity based on a location calculated by the GNSS receiver using the first plurality of radio signals and a known location of the time distribution device.

24. The time distribution device of claim 19, wherein, to calculated the first signal integrity, the manipulation detection component is further configured to:
  measure a rate of change of the first time; and
  compare the rate of change with a holdover performance threshold of the time distribution device.

25. The time distribution device of claim 22, wherein the manipulation detection component is configured to determine the first signal integrity based on historical satellite data.

* * * * *